US006931627B2

(12) United States Patent
Arbouzov et al.

(10) Patent No.: US 6,931,627 B2
(45) Date of Patent: Aug. 16, 2005

(54) SYSTEM AND METHOD FOR COMBINATORIAL TEST GENERATION IN A COMPATIBILITY TESTING ENVIRONMENT

(75) Inventors: Leonid M. Arbouzov, Campbell, CA (US); Konstantin S. Bobrovsky, Berdsk (RU)

(73) Assignee: Sun Microsystems, Inc., Santa Clara, CA (US)

( * ) Notice: Subject to any disclaimer, the term of this patent is extended or adjusted under 35 U.S.C. 154(b) by 689 days.

(21) Appl. No.: 09/906,636

(22) Filed: Jul. 16, 2001

(65) Prior Publication Data

US 2004/0015870 A1 Jan. 22, 2004

Related U.S. Application Data

(60) Provisional application No. 60/292,185, filed on May 18, 2001, and provisional application No. 60/291,670, filed on May 16, 2001.

(51) Int. Cl.$^7$ ................................................. G06F 9/44
(52) U.S. Cl. ...................... 717/124; 717/126; 917/128
(58) Field of Search ................................. 717/124–129, 717/136, 140, 143, 144, 157

(56) References Cited

U.S. PATENT DOCUMENTS

| | | | | |
|---|---|---|---|---|
| 5,701,487 A | * | 12/1997 | Arbouzov | 717/124 |
| 5,854,932 A | * | 12/1998 | Mariani et al. | 717/116 |
| 5,867,710 A | * | 2/1999 | Dorris et al. | 717/124 |
| 5,910,958 A | * | 6/1999 | Jay et al. | 714/738 |
| 6,256,777 B1 | * | 7/2001 | Ackerman | 717/129 |
| 6,577,982 B1 | * | 6/2003 | Erb | 702/120 |
| 6,671,875 B1 | * | 12/2003 | Lindsey et al. | 717/129 |
| 6,708,324 B1 | * | 3/2004 | Solloway et al. | 717/124 |
| 6,728,949 B1 | * | 4/2004 | Bryant et al. | 717/127 |
| 6,760,907 B2 | * | 7/2004 | Shaylor | 717/158 |
| 6,842,893 B1 | * | 1/2005 | Sangavarapu et al. | 717/129 |
| 6,865,730 B1 | * | 3/2005 | Burke et al. | 717/116 |

FOREIGN PATENT DOCUMENTS

EP     0 834 810 A     8/1998

OTHER PUBLICATIONS

Wah et al, "The status of manip a multicomputer architecture for solving combinatorial extremum search problems", IEEE, pp 56–63, 1984.*

Korel et al, "Assertion orinted automated test data genertaion,", IEEE, pp 71–80, 1996.*

Neary et al, "Advanced egar scheduling for Java based adaptively parallel computing", ACM JHI, pp 56–65, Nov. 3–5, 2002.*

Sullivan et al, "Software assurance by nounded exhaustive testing", ACM ISSTA, pp 133–142, Jul. 11–14, 2004.*

Gotlieb, A. et al.: "Automatic Test Data Generation Using Constraint Solving Techniques" Software Engineering Notes, Association for Computing Machinery. New York, US, vol. 23, No. 2, Mar. 1, 1998 , pp. 53–62, XP000740946 ISSN:0163–5948 abstract pp. 57, col. 1, paragraph 4.

* cited by examiner

*Primary Examiner*—Anil Khatri
(74) *Attorney, Agent, or Firm*—Martine Penilla & Gencarella, LLP

(57) ABSTRACT

A computer program embodied on a computer readable medium is provided for combinatorial test generation. The computer program includes a code segment that obtains an assertion, wherein the assertion includes a plurality of assertion variables, and a code segment that generates a slot tree having a plurality of nodes, wherein the slot tree represents the assertion variables of the obtained assertion. Further included is a code segment that processes the nodes of the slot tree to generate tests for the assertion. As above, the slot tree can comprise a plurality of leaf slot nodes that represent the actual assertion variables, each leaf slot node including a value set for the assertion variable that the leaf slot node represents. The slot tree can also include a plurality of non-leaf slot nodes that are capable of referencing other nodes, wherein the other nodes can be leaf slot nodes and non-leaf slot nodes.

20 Claims, 8 Drawing Sheets

SYSTEM AND METHOD FOR COMBINATORIAL TEST GENERATION IN A COMPATIBILITY TESTING ENVIRONMENT

CROSS REFERENCE TO RELATED APPLICATIONS

This application claims the benefit of (1) U.S. Provisional Patent Application having Ser. No. 60/291,670, filed on May 16, 2001, entitled "System and Method for Compatibility Testing in a Java Environment," and (2) U.S. Provisional Patent Application having Ser. No. 60/292,185, filed on May 18, 2001, entitled "System and Method for Combinatorial Test Generation in a Compatibility Testing Environment." Each of these provisional patent applications is incorporated herein by reference. This application is also related to (1) U.S. patent application Ser. No. 09/881,822, filed Jun. 14, 2001, and entitled "System and Method for Specification Tracking in a Java Compatibility Testing Environment," and (2) U.S. patent application Ser. No. 09/881,791, filed Jun. 14, 2001, and entitled "System and Method for Automated Assertion Acquisition in a Java Compatibility Testing Environment." Each of these related patent applications is incorporated herein by reference.

BACKGROUND OF THE INVENTION

1. Field of the Invention

The present invention relates to general software testing, and more particularly to combinatorial test generation for compatibility testing of Java technologies.

2. Description of the Related Art

Currently, Java environments can be categorized into various Java technologies. A Java technology is defined as a Java specification and its reference implementation. Examples of Java technologies are Java 2 Standard Edition (J2SE), Java 2 Enterprise Edition (J2EE), and Mobile Information Device Profile (MIDP). As with most other types of Java software, a new Java technology should be tested to assure consistency across multiple platforms. This testing is generally performed using compatibility testing.

Compatibility testing refers to the methods used to test an implementation of a Java technology specification in order to assure consistency across multiple hardware platforms, operating systems, and other implementations of the same Java technology specification. When this assurance is accomplished by means of a formal process, application developers can then be confident that an application will run in a consistent manner across all tested implementations of the same Java technology specification. This consistent specification-based behavior is a primary function of compatibility testing.

The process of developing compatibility tests for a fairly large API is usually a multi-month process that includes the development of a number of related components. Unlike product testing, which can begin as soon as some part of the program is written, compatibility testing requires both a working implementation and an accurate, complete specification in order to complete the test development process.

FIG. 1 is a flow diagram showing a prior art process 100 for creating compatibility tests. As shown in process 100, a Java specification 102 is processed to create a set of relatively small testable assertions 104. Statements are generally considered testable assertions if they are intended to describe behavior of an API and can be tested by compatibility tests. Also, examples or sample code pieces that are provided in the specification are typically testable and can be verified by the compatibility tests. In this sense, examples or sample code are generally considered testable assertions.

On the other hand, statements intended to describe the behavior of an API, but which cannot be tested by compatibility tests due to the special nature of the behavior or functionality, are generally considered non-testable assertions. Similarly, some statements form general descriptions of the API such as a description of a package, class, method, or field, and so forth. If such a general description does not describe behavior, but is aimed rather at providing a context for the rest of the text, then such a statement generally is not intended to be an assertion. Hence, these statements are generally not considered to be assertions due to their nature.

Once the set of testable assertions 104 is obtained, one or more tests 106 for each assertion is written. Unfortunately, it is not always clear in conventional compatibility testing exactly what should be tested in each assertion and how many tests should be written for each assertion. Theoretically, every logical entity in the assertion could be tested and an infinite number of tests could be written to fully test the assertion. But in practice this, of course, is not affordable.

In view of the foregoing, there is a need for methods providing improved compatibility test generation. The methods should generate compatibility tests that utilize the least number of combinations of assertion entities provide an acceptable quality of testing of the assertion.

SUMMARY OF THE INVENTION

Broadly speaking, the present invention fills these needs by providing combinatorial test generation systems and methods that generate compatibility tests using a slot tree. The slot tree of the embodiments of the present invention allows efficient test generation, while providing a means to easily select assertion variable value combinations that seem most appropriate for good quality of testing in each particular case. In one embodiment, a method for combinatorial test generation is disclosed. An assertion is obtained from a specification, wherein the assertion includes a plurality of assertion variables. Next, a slot tree is provided having a plurality of nodes, wherein each node represents an assertion variable. The nodes of the slot tree are then processed to generate tests for the assertion. Optionally, each node can further include a value set having a plurality of values for the assertion variable represented by the node. Also, the plurality of nodes can include nodes that are leaf slots, which represent an actual assertion variable. The plurality of nodes can also include nodes that are non-leaf slots, which are used to construct combination generators from other nodes.

In another embodiment, a combinatorial test generator tree structure is disclosed. The combinatorial test generator tree structure includes a plurality of leaf slot nodes that represent actual assertion variables, wherein each leaf slot node includes a value set for the assertion variable that the leaf slot node represents. Also included is a plurality of non-leaf slot nodes that are capable of referencing other nodes, wherein the other nodes can be leaf slot nodes and non-leaf slot nodes. The non-leaf slot nodes are used to construct combination generators from the other nodes by combining the value sets of the leaf slot nodes. Optionally, a portion of the non-leaf slot nodes can include all possible combinations of the value sets of child nodes, and a portion of the non-leaf slot nodes can include a portion of all possible combinations of the value sets of child nodes. Also optionally, the portion of all possible combinations of the value sets of child nodes can include every value in the value sets of each of the child nodes. The nodes can be Java objects based on Java slot classes that include combining method calls that determine how the child nodes are combined.

A computer program for combinatorial test generation embodied on a computer readable medium is disclosed in a further embodiment of the present invention. The computer program includes a code segment that obtains an assertion, wherein the assertion includes a plurality of assertion variables, and a code segment that generates a slot tree having a plurality of nodes, wherein the slot tree represents the assertion variables of the obtained assertion. Further included is a code segment that processes the nodes of the slot tree to generate tests for the assertion. As above, the slot tree can comprise a plurality of leaf slot nodes that represent the actual assertion variables, each leaf slot node including a value set for the assertion variable that the leaf slot node represents. The slot tree can also include a plurality of non-leaf slot nodes that are capable of referencing other nodes, wherein the other nodes can be leaf slot nodes and non-leaf slot nodes.

Advantageously, the embodiments of the present invention provide combinatorial test generation in an efficient manner provides a means to easily select assertion variable value combinations that seem most appropriate for good quality of testing in each particular case. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a combinatorial test generator. The embodiments of the present invention test assertions by finding and marking all logically significant parts of the assertion, determining the set of possible values for every found assertion variable, and writing a set of tests, varying the values of the assertion variables from test to test. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
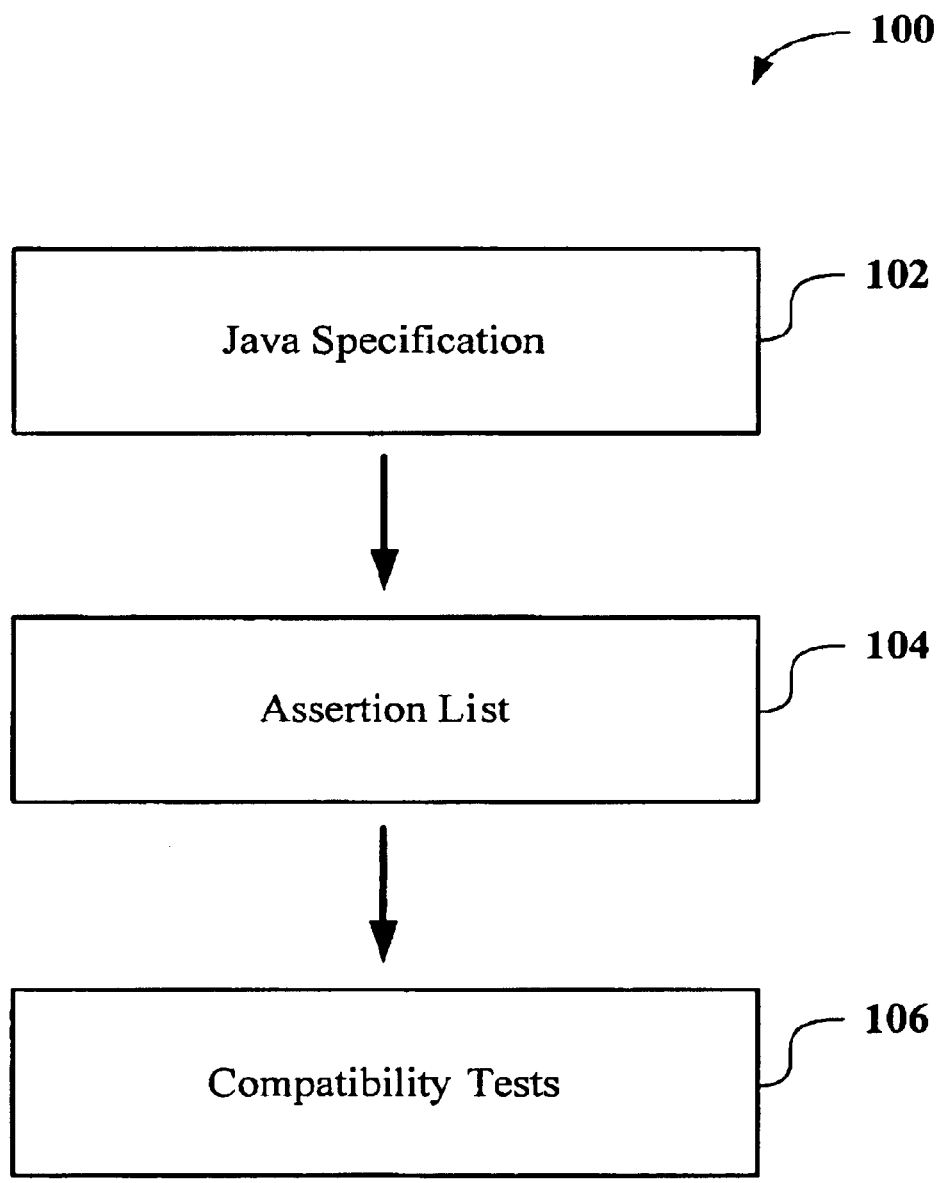
FIG. 1 is a flow diagram showing a prior art process for creating compatibility tests.
Figure 2:
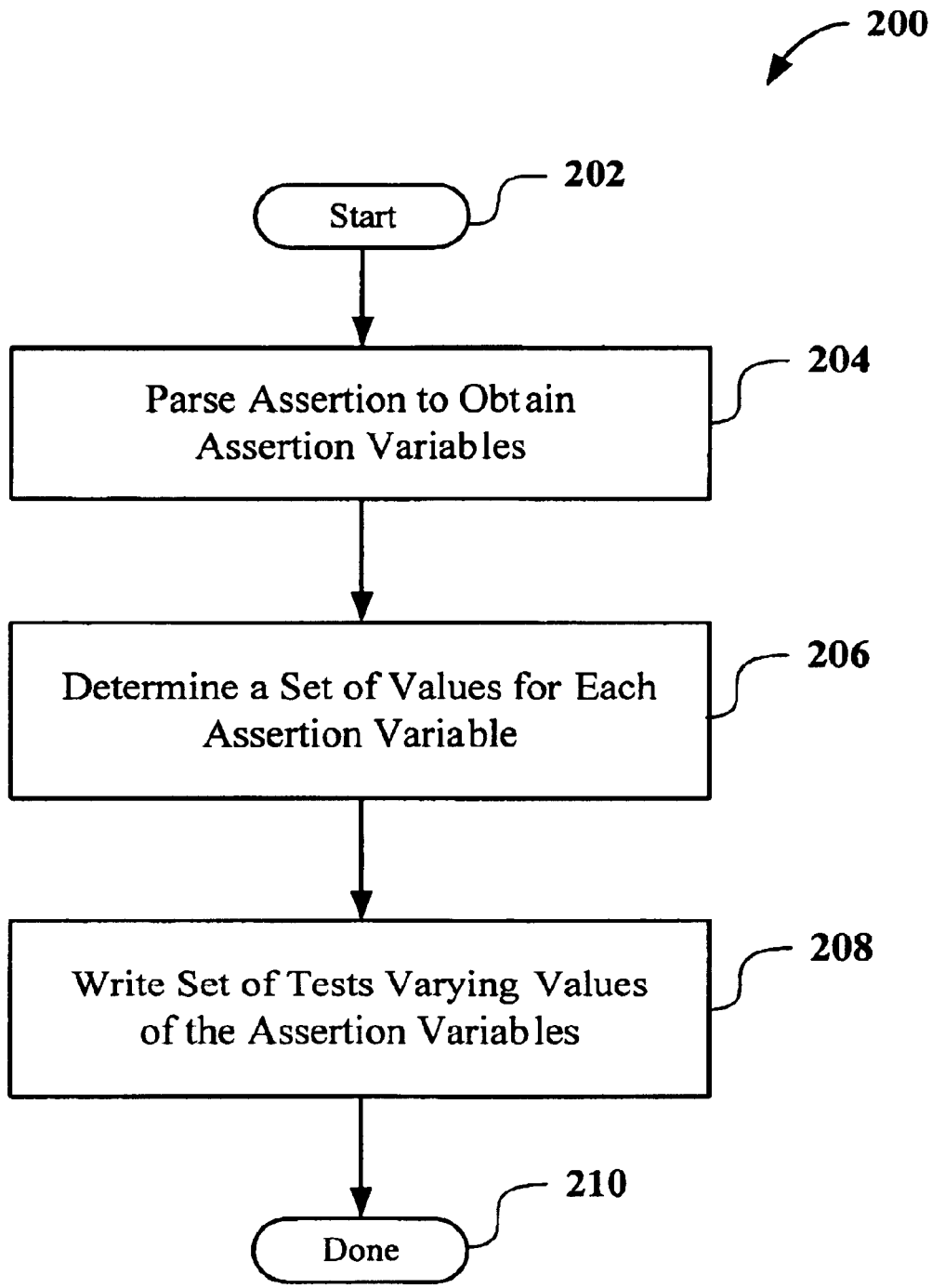
FIG. 2 is a flowchart showing a method for generating combinatorial tests for an assertion, in accordance with an embodiment of the present invention.

FIG. 1 was described in terms of the prior art. FIG. 2 is a flowchart showing a method 200 for generating combinatorial tests for an assertion, in accordance with an embodiment of the present invention. In an initial operation 202, preprocess operations are performed. Preprocess operations include obtaining assertions from a specification and other preprocess operations that will be apparent to those skilled in the art.

In operation 204, the assertion is parsed to obtain assertion variables. As mentioned above, an assertion is a statement that is intended to describe behavior of an API and that can be tested by compatibility tests. An assertion variable is a logically significant portion of the assertion. Hence, during operation 204, all logically significant portions of the assertion are determined and marked as assertion variables. This can be performed manually or through the use of a specialized code module.

A set of values is then determined for each assertion variable, in operation 206. As above, operation 206 can be performed manually or through the use of a specialized code module. In any particular assertion, each assertion variable of that assertion generally can have any of a plurality of values. Thus, in operation 206, these values are determined for each assertion variable of the subject assertion. Moreover, an assertion variable can correspond to several logical entities in the assertion, each having their own value set. In this case, the number of elements in all such value sets should be equal and will be iterated synchronously. For example, if tests should check how a compiler reacts to different brackets with something in between, such a compound assertion variable (slot) can be created whose values consist of pairs: '(')', '[']', '{'}', '<' '>'. Each "subslot's" (first/second element of current pair) value is programmatically accessible from the test's code.

Then, in operation 208, a set of tests for the assertion variables is created. The set of tests preferably varies the values of each assertion variable to better test the assertion, as described in greater detail subsequently. If processing an assertion yielded N assertion variables V1, . . . , Vn with corresponding values sets S1, . . . Sn, then the maximum number (Tmax) of tests would be equal to the number of all possible combinations (C1, . . . , Cn), where Ci runs true all values in the ith value set, namely:

$$T\max=|S1|* \ldots *|Sn|,$$

where |Si| is the number of values in the i'th value set

In many cases Tmax would be too big to write Tmax tests. So, some methods for creating reasonable number of assertion variable value combinations must be developed. As described in greater detail below, the embodiments of the present invention utilize "slot trees" to generate compatibility tests having a number of assertion variable value combinations that ensure every value of each assertion variable is tested.

Post process operations are then performed in operation 210. Post process operations include executing the compatibility tests and other post process operations that will be apparent to those skilled in the art. In general, a combination can be defined as a point in n-dimensional space, where n is the number of assertion variables and i-th coordinate of the point is the index of the value of the i-th assertion variable in this combination. Hence, the number ways in which the set of combinations can be selected for testing the underlying assertion can be very large (with big n's and large value sets).

Figure 3:
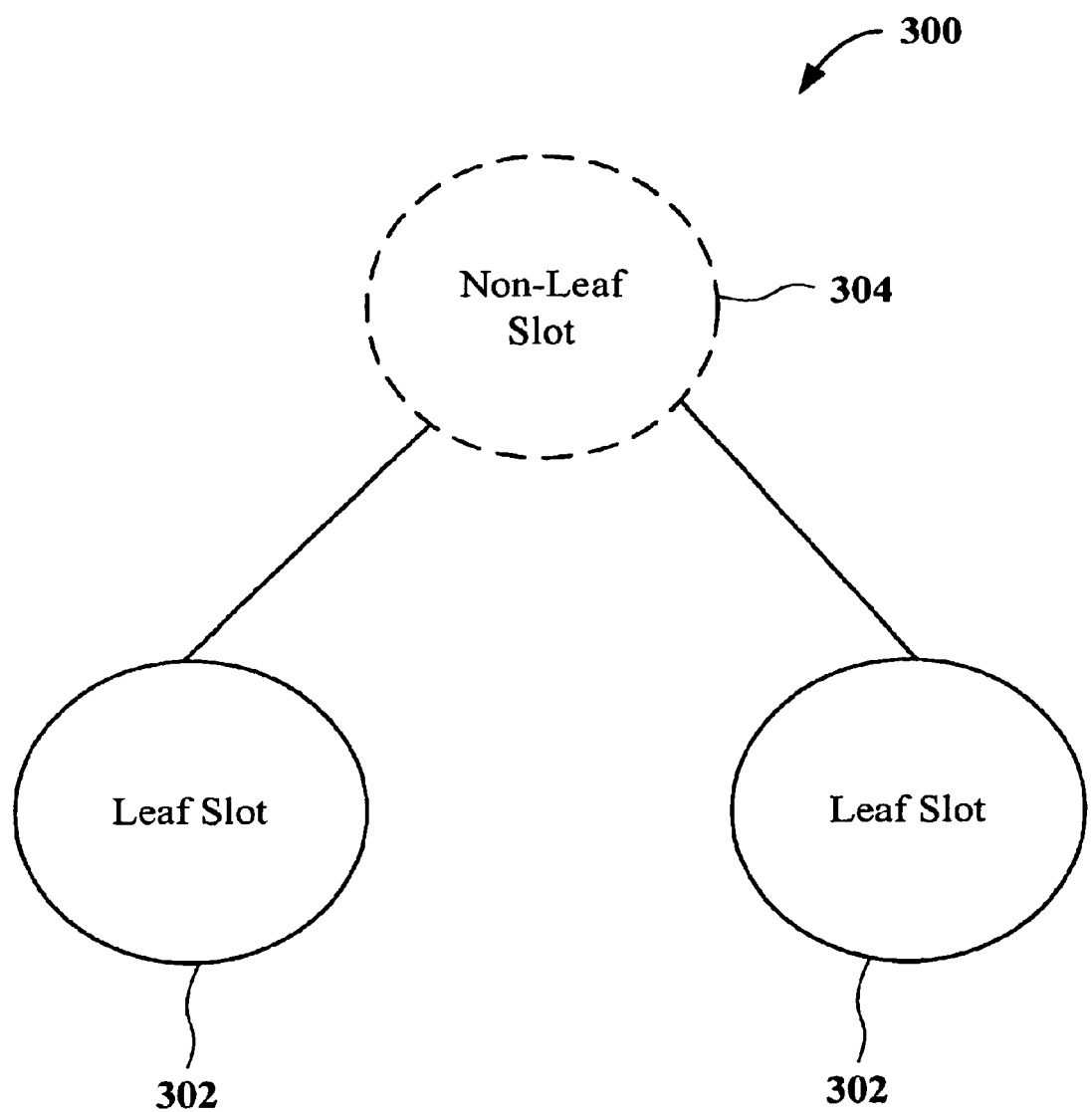
FIG. 3 is a diagram showing a slot tree, in accordance with an embodiment of the present invention.

As mentioned above, embodiments of the present invention utilize "slots" to create compatibility tests. FIG. 3 is a diagram showing a slot tree 300, in accordance with an embodiment of the present invention. The slot tree 300 includes leaf slots 302 referenced by a non-leaf slot 304. Slots represent the assertion variables with their respective value sets and they also incorporate features for generating assertion variable value combinations. Slots can be of two basic types, namely, leaf slots 302 and non-leaf slots 304.

Leaf slots 302 are slots that actually represent an assertion variable, and their value set is the value set of the corresponding assertion variable. Non-leaf slots 304 are used to construct combination generators from other slots, which can be either leaf slots 302 or other non-leaf slots 304. Even leaf slots are combination generators: the number of combinations they generate equals the size of the leaf slot's value set and each combination is a singleton comprised of a slot's value. The user can control the manner in which slots are combined to form higher-level, non-leaf slots, by selecting an appropriate method for combining slots.

Figure 4:
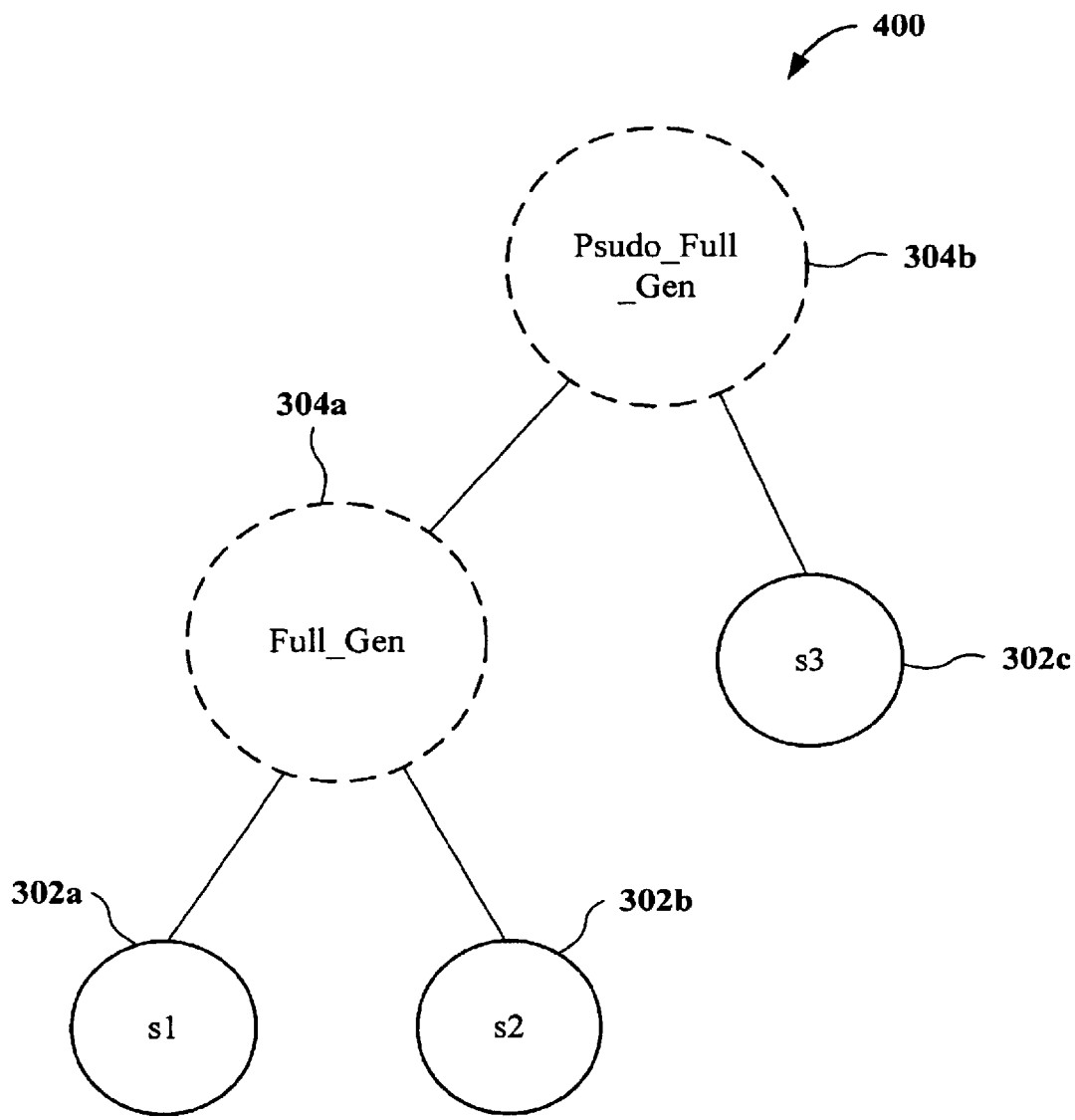
FIG. 4 is a diagram showing an exemplary slot tree, in accordance with an embodiment of the present invention.

FIG. 4 is a diagram showing an exemplary slot tree 400, in accordance with an embodiment of the present invention. The exemplary slot tree 400 includes leaf slots s1 302a and s2 302b referenced by non-leaf slot 304a, and non-leaf slot 304b, which references both non-leaf slot 304a and leaf slot s3 302c. Further, in this example, the three leaf slots s1, s2, and s3 have the following values:

Slot s1=new Slot(new String[ ] {"11", "12", "13"});
Slot s2=new Slot(new String[ ] {"21", "22"});
Slot s3=new Slot(new String[ ] {"31", "32", "33", "34"});

Using the leaf slots s1, s2, non-leaf slot 304a can be created. In this case, non-leaf slot 304a can be created by combining s1 and s2 to produce all possible combinations of these slots:

Slot full_gen=Slot.multiplyFull(s1, s2);

Thus, the value set of the non-leaf slot 304a is now a set of pairs:

{"11", "21"} {"11", "22"}
{"12", "21"} {"12", "22"}
{"13", "21"} {"13", "22"}

Having created non-leaf slot 304a, a new non-leaf slot 304b can be created by combining non-leaf slot 304a and leaf slot s3 302c. Using the embodiments of the present invention, non-leaf slot 304b can be created such that the least number of combinations are used that ensure every value of each of its child slots occurs at least once.

Slot pseudo_full_gen=Slot.multiplyPseudoFull(full_gen, s3);

The number of combinations produced by non-leaf slot 304b is the maximum size of a value set of its child—six in this case. Each combination, generated by the non-leaf slot 304b is now a triple:

{"11", "21","31"} {"11", "22", "32"}
{"12", "21", "33"} {"12", "22", "34"}
{"13", "21", "31"} {"13", "22", "32"}

In general, non-leaf slots 304 can have an arbitrary number of children of arbitrary (leaf, non-leaf) kind. Further, the embodiments of the present invention can use additional "combining" methods other than multiplyFull and multiplyPseudoFull.

In the embodiments of the present invention, the slots are usually used together with Java preprocessor technology to generate tests. A single template is written where the necessary slot tree is constructed, and then a method of the slot's tree root that processes the slot tree is invoked in a cycle until it returns false. The number of tests equals the number of method invocations. Inside this main cycle current values of the leaf-slots constituting the slot tree can be easily accessed via the Slot's method calls. Non-meta code within the loop bounds accesses the values of slots via macro calls.

Figure 5:
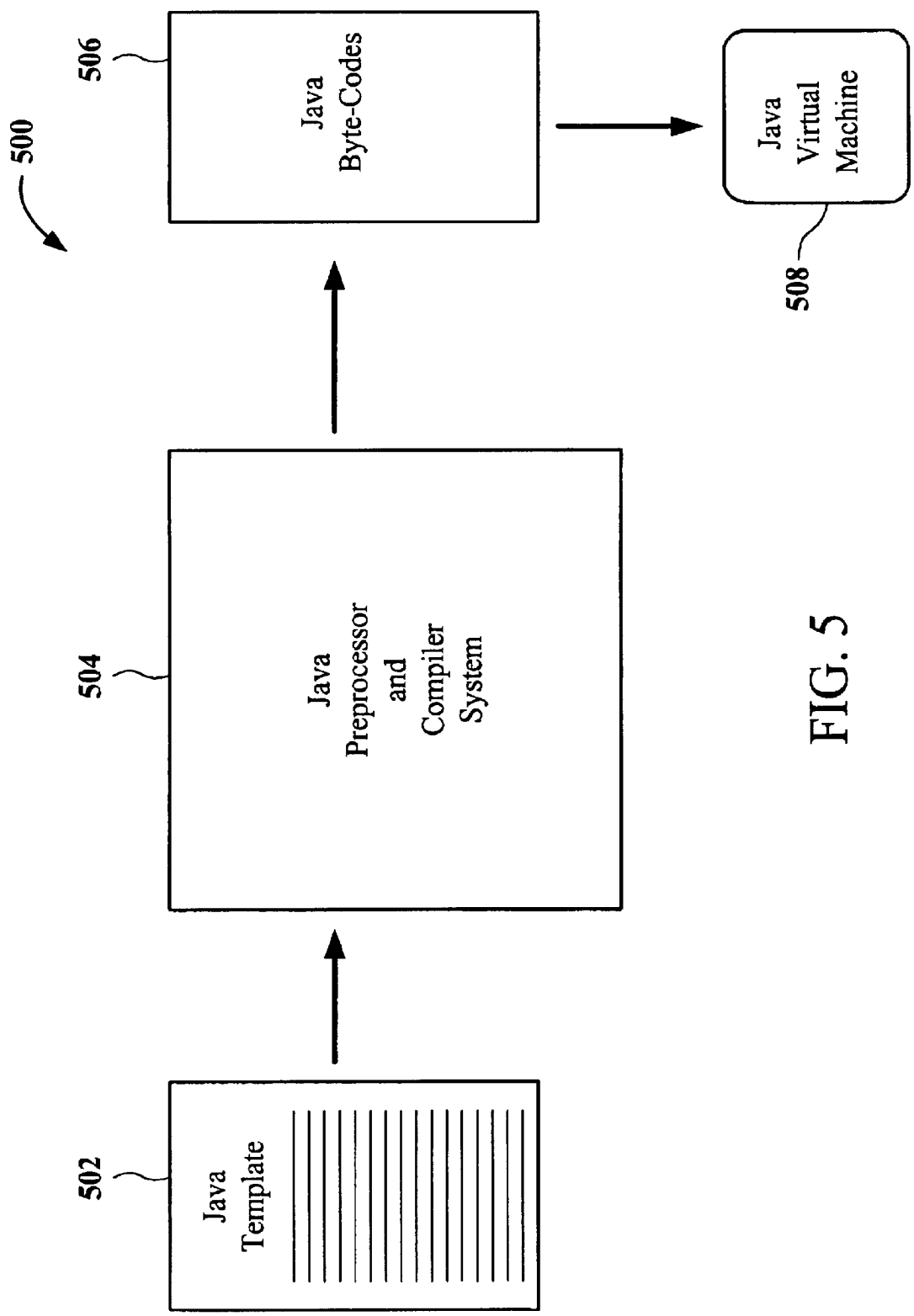
FIG. 5 is a block diagram showing a Java program generation process for use in compatibility test generation, in accordance with an embodiment of the present invention.

FIG. 5 is a block diagram showing a Java program generation process 500 for use in compatibility test generation, in accordance with an embodiment of the present invention. The Java program generation process 500 shows a Java template text file 502, a Java preprocessor and compiler system 504, a Java byte-codes file 506, and a Java virtual machine 508. As mentioned above, the Java template text file 502 comprises a Java language program and meta code for use with the Java preprocessor to create compatibility tests.

In operation, the Java template text file 502 is provided to the Java preprocessor and compiler system 504, which preprocesses and compiles the Java template text file 502. The Java preprocessor and compiler system 504 generates a Java byte-codes file 506, which can then be executed on any Java enabled platform having a Java virtual machine 508. The Java virtual machine 508 is used as an interpreter to provide portability to Java applications. In general, developers design Java applications as hardware independent software modules, which are executed by Java virtual machines. The Java virtual machine layer is developed to operate in conjunction with the native operating system of the particular hardware on which the mobile multimedia framework system is to run. In this manner, Java applications can be ported from one hardware device to another without requiring updating of the application code.

Unlike most programming languages, in which a program is compiled into machine-dependent, executable program code, Java classes are compiled into machine independent byte-code class files 506, which are executed by a machine-dependent virtual machine 508. The Java virtual machine 508 provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

Hence, Java is an interpreted language. The source code of a Java program is compiled into an intermediate language called "bytecode". The bytecode is then converted (interpreted) into machine code at runtime. Thus, Java programs are not dependent on any specific hardware and will run in any computer with the Java Virtual Machine 508 software.

Figure 6:
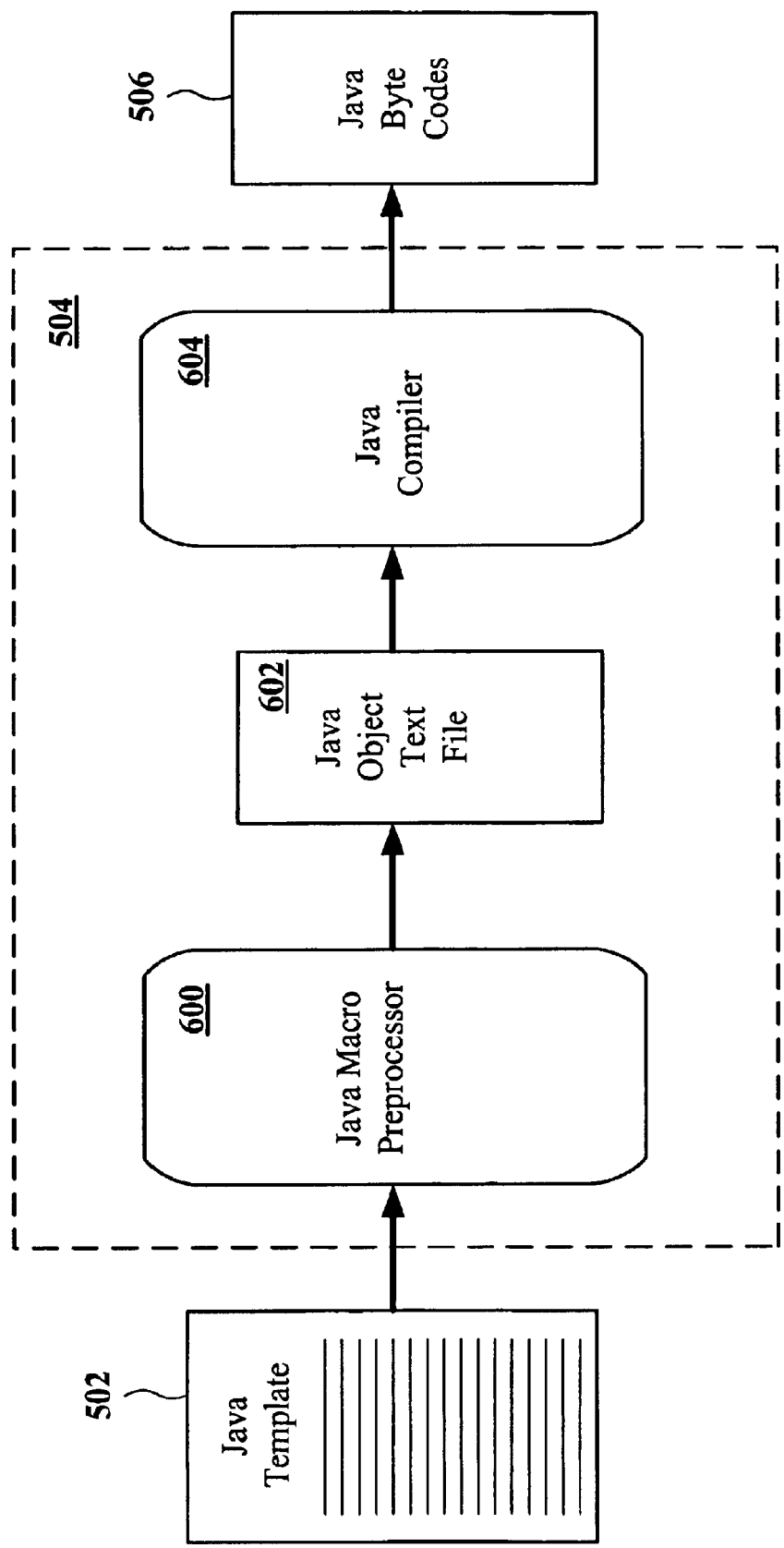
FIG. 6 is a block diagram showing a Java preprocessor and compiler system, in accordance with an embodiment of the present invention.

FIG. 6 is a block diagram showing a Java preprocessor and compiler system 504, in accordance with an embodiment of the present invention. The Java preprocessor and compiler system 504 includes a Java macro preprocessor 600 and a Java compiler 604. The Java macro preprocessor 600 of the embodiments of the present invention allows preprocessing of Java language program text files 502. Similar to preprocessors for other programming languages, the Java macro preprocessor 600 of the embodiments of the present invention allows Java language program text files 502 to be processed prior to compilation. This provides greater flexibility in program development, such as allowing conditional compiling. However, unlike prior art preprocessors, the Java macro preprocessor 600 of the embodiments of the present invention advantageously uses the Java programming language as its meta language.

In use, the Java macro preprocessor 600 receives the Java template 502, which includes Java meta language. The Java macro preprocessor 600 then processes the Java template 502 to produce a Java object text file 602. The Java object text file 602 is essentially a Java program that can be compiled by a Java compiler. For example, if the Java template file 502 included a conditional compiling directive to compile one of two blocks of code depending on a particular condition, then the Java object text file 602 would include one of the blocks of code. In some embodiments, the other block of code would not be placed in the Java object text file 602, while in other embodiments, the block of code could be set off as a comment, which would not be compiled.

The Java object text file 602 is then provided to the Java compiler 604, which compiles the Java object text file 602 to generate a Java byte-codes file 506. As mentioned above, the Java macro preprocessor 600 of the embodiments of the present invention advantageously uses the Java programming language as its meta language. The Java meta language used by the Java macro preprocessor 600 allows the meta language preprocessor directives to be as flexible and powerful as the Java programming language itself.

Figure 7:
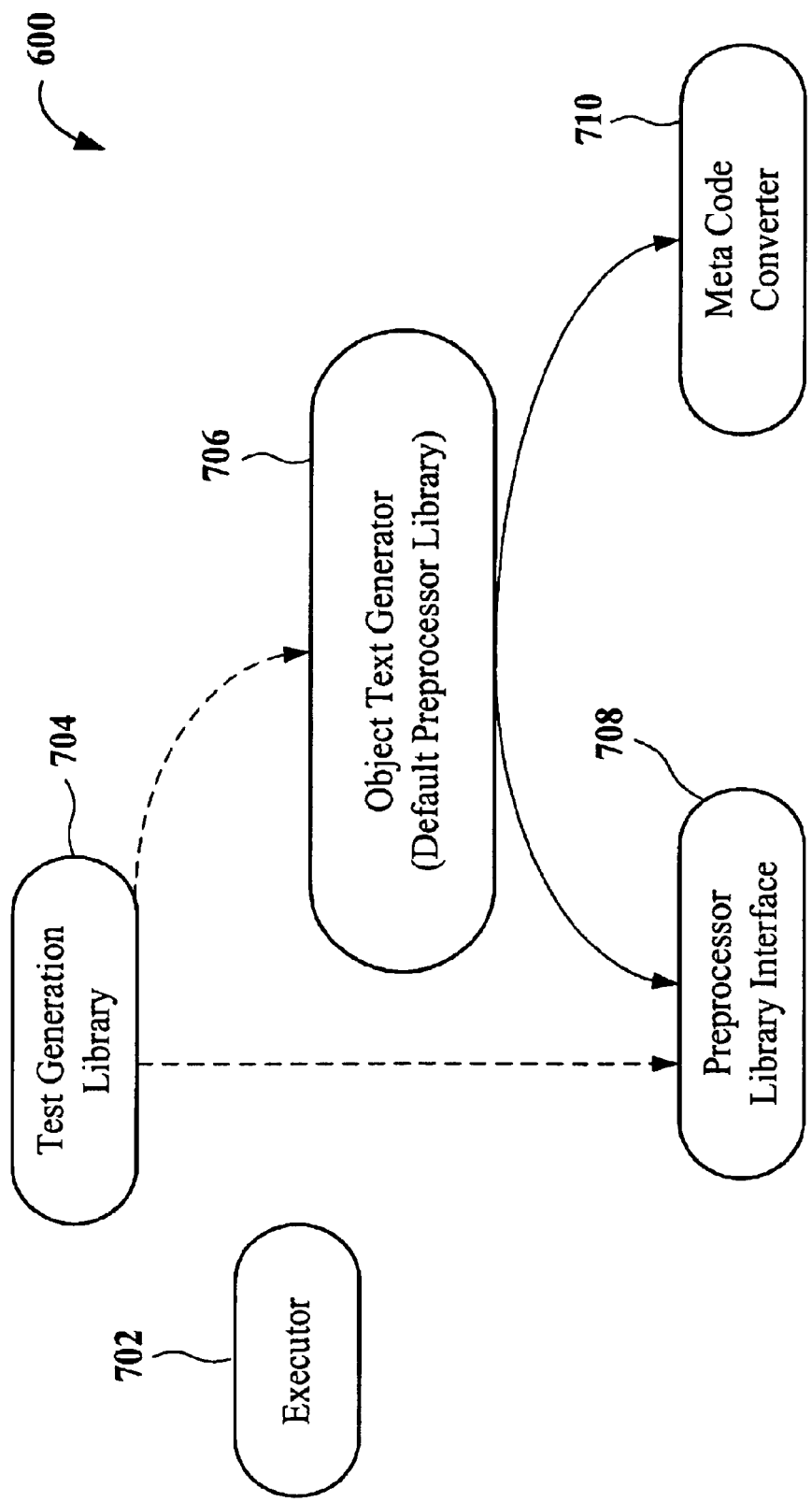
FIG. 7 is a block diagram showing a Java preprocessor, in accordance with an embodiment of the present invention.

FIG. 7 is a block diagram showing a Java preprocessor 600, in accordance with an embodiment of the present invention. The Java preprocessor 600 includes an executor module 702, a test generation library 704, an object text generator module 706, a preprocessor library interface module 708, and a meta code converter module 710.

The Java preprocessor 600 includes two core modules that implement the preprocessor itself, namely, the meta code converter module 710 and the object text generator module 706. The meta code converter module 710 includes a main class, JmppReader, and auxiliary classes, which can be defined in the same source file. The meta code coverter module 710 transforms a single line of a template code into a line of the intermediate program code. Note that the intermediate program includes not only lines resulted from the 'template line'->'intermediate program line' conversion. The intermediate program also includes lines generated by the object text generator module 706.

The object text generator module 706 includes a main class, JmppLib, and auxiliary classes, which can be defined in the same source file. The object text generator module 706 is the main module of the preprocessor 600, and is responsible for the intermediate program's prolog and epilog code generation, and the compiling of the intermediate program (using a Java compiler). The object text generator module 706 is also responsible for running the intermediate program, which actually generates the object text file. The main class of the object text generator module 706 also serves as a super class for any preprocessor libraries, which are extensions that use the preprocessor engine for more specific purposes, such as for generating a number of tests from a single template.

The Java preprocessor 600 further includes two additional modules that extend the preprocessor's functionality, namely, the preprocessor library interface module 708 and the executor module 702. The preprocessor library interface module 708 typically includes a single interface. The preprocessor library interface module 708 specifies a contract that should be implemented by any Java preprocessor library, such as the test generation library 704, that is to be supported. This interface exposure allows the preprocessor to be usable inside other Java applications, such as a test development kit. There are two levels of support that a preprocessor library can request from an interactive test development system, basic and full. The basic support level generally only supports test generation. The full support level supports the basic level plus a template creation wizard.

The executor module 702 typically includes a single class that allows the executor module 702 to preprocess templates using an object text generator different from the default one described above. The executor module 702 calculates the object text generator class name based on the first template line and the command line options, loads the object text generator class, and invokes main method of the object text generator class.

The test generation 704 library is the engine behind the Java preprocessor, allowing the test developer to dynamically expand java and .html files from a single test template instead of writing Java and .html files manually. In this manner, embodiments of the present invention can ensure the generated Java and .html files are created according to format specified as well as avoid code/text duplication. An output format can vary upon user's needs so the user can create java and .html files in a different format using a single template. Also, the user can use parametrized test generation to create a set of similar tests from a single block of code. Test templates can use a jmpp extension by convention. The output formats of the generated java and .html files correspond to the JavaTest harness requirements.

Figure 8:
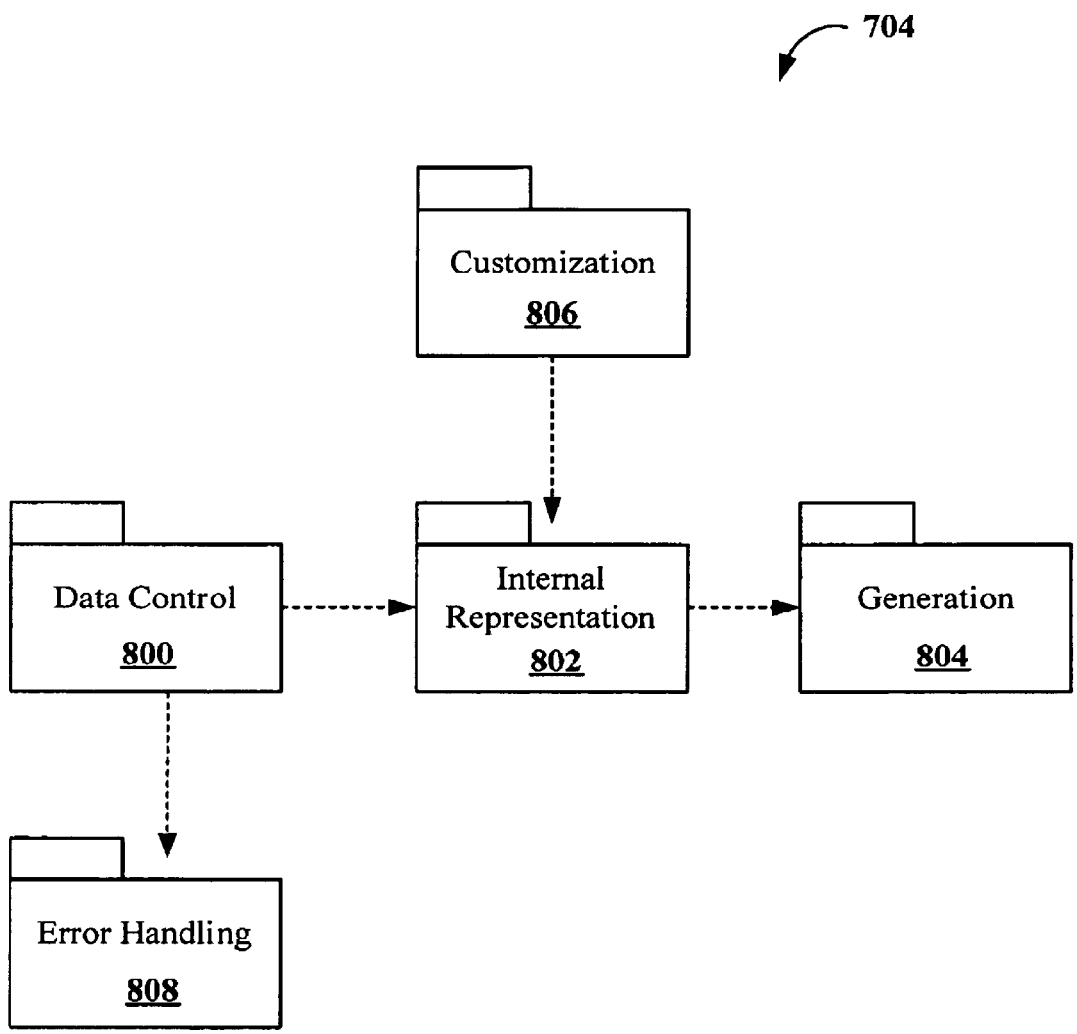
FIG. 8 is a block diagram showing the module decomposition of the test generation library, in accordance with an embodiment of the present invention.

FIG. 8 is a block diagram showing the module decomposition of the test generation library 704, in accordance with an embodiment of the present invention. The test generation library includes a data control module 800, an internal representation module 802, a generation module 804, a customizing module 806, and an error handling module 808. Each of the modules of the test generation library 704 comprises internal classes, methods and corresponding variables that are specific to each individual module.

More specifically, the data control module 800 provides a number of methods that control the correctness and completeness of the corresponding data set. The test generation library 704 distinguishes three levels of the given template context hierarchy, namely, Directory Level, File Level, and Test Level. Every level has its specific set of mandatory, optional variables or variables-switches. The internal representation module 802 comprises a number of internal classes representing template entities such as, Method, Test case, and Test Description. This information is then used at the java and .html files generation step.

The customizing module 806 is responsible for the test generation process customization. Specifically, the customizing module 806 provides methods for property file processing and inline customization from the template. The error handling module 808 provides a number of classes to represent exceptional situations, and a generation module 804 is responsible for actual java and .html files generation.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, hard disks, removable cartridge media, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for combinatorial test generation, comprising the operations of:
   obtaining an assertion from a specification, wherein the assertion includes a plurality of assertion variables;
   providing a slot tree having a plurality of nodes, wherein each node represents an assertion variable; and
   processing the nodes of the slot tree to generate tests for the assertion.

2. A method as recited in claim 1, wherein each node further includes a value set having a plurality of values for the assertion variable represented by the node.

3. A method as recited in claim 2, wherein the plurality of nodes includes nodes that are leaf slots.

4. A method as recited in claim 3, wherein the leaf slots represent an actual assertion variable.

5. A method as recited in claim 4, wherein the plurality of nodes further includes nodes that are non-leaf slots.

6. A method as recited in claim 5, wherein the non-leaf slots are used to construct combination generators from other nodes.

7. A method as recited in claim 6, wherein the other nodes can be leaf slots and non-leaf slots.

8. A combinatorial test generator tree structure, comprising:
   a plurality of leaf slot nodes that represent actual assertion variables, each leaf slot node including a value set for the assertion variable that the leaf slot node represents; and
   a plurality of non-leaf slot nodes that are capable of referencing other nodes, wherein the other nodes can be leaf slot nodes and non-leaf slot nodes, wherein the non-leaf slot nodes are used to construct combination generators from the other nodes by combining the value sets of the leaf slot nodes.

9. A combinatorial test generator tree structure as recited in claim 8, wherein a portion of the non-leaf slot nodes include all possible combinations of the value sets of child nodes.

10. A combinatorial test generator tree structure as recited in claim 8, wherein a portion of the non-leaf slot nodes include a portion of all possible combinations of the value sets of child nodes.

11. A combinatorial test generator tree structure as recited in claim 10, wherein the portion of all possible combinations of the value sets of child nodes includes every value in the value sets of each of the child nodes.

12. A combinatorial test generator tree structure as recited in claim 11, wherein the nodes are Java objects based on Java slot classes.

13. A combinatorial test generator tree structure as recited in claim 12, wherein the Java slot classes for the non-leaf slot nodes include combining method calls that determine how the child nodes are combined.

14. A computer program embodied on a computer readable medium for combinatorial test generation, comprising:
   a code segment that obtains an assertion, wherein the assertion includes a plurality of assertion variables;
   a code segment that generates a slot tree having a plurality of nodes, wherein the slot tree represents the assertion variables of the obtained assertion; and
   a code segment that processes the nodes of the slot tree to generate tests for the assertion.

15. A computer program as recited in claim 14, wherein the slot tree comprises a plurality of leaf slot nodes that represent the actual assertion variables, each leaf slot node including a value set for the assertion variable that the leaf slot node represents.

16. A computer program as recited in claim 15, wherein the slot tree further comprises a plurality of non-leaf slot nodes that are capable of referencing other nodes, wherein the other nodes can be leaf slot nodes and non-leaf slot nodes.

17. A computer program as recited in claim 16, wherein the non-leaf slot nodes are used to construct combination generators from the other nodes by combining the value sets of the leaf slot nodes.

18. A computer program as in claim 17, wherein a portion of the non-leaf slot nodes include all possible combinations of the value sets of child nodes.

19. A computer program as recited in claim 18, wherein a portion of the non-leaf slot nodes include a portion of all possible combinations of the value sets of child nodes.

20. A combinatorial test generator tree structure as recited in claim 19, wherein the portion of all possible combinations of the value sets of child nodes includes every value in the value sets of each of the child nodes.

* * * * *